Patented Jan. 6, 1925.

1,522,251

UNITED STATES PATENT OFFICE.

ARTHUR LÜTTRINGHAUS, OF MANNHEIM, AND PAUL NAWIASKY, OF LUDWIGS-HAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

VAT DYESTUFFS.

No Drawing. Application filed August 24, 1923. Serial No. 659,214.

*To all whom it may concern:*

Be it known that we, ARTHUR LÜTTRINGHAUS and PAUL NAWIASKY, citizens of the German Empire and Austria, respectively, residing at Mannheim and Ludwigshafen-on-the-Rhine, respectively, Germany, have invented new and useful Improvements in Vat Dyestuffs, of which the following is a specification.

The specification of Letters Patent No. 1,093,427 of April 14, 1914, describes derivatives of dibenzanthrone obtained by oxidizing dibenzanthrone, with or without subsequent reduction of the direct oxidation product.

We have now found that the said oxidation products of dibenzanthrone, whether the direct or reduced product which we comprise by the expression oxidized dibenzanthrone, are converted into very valuable vat dyestuffs by condensing with benzotrichlorid by which term we also include substituted benzotrichlorid. Solvents, or diluents, may be used or not. The properties of the vat dyestuffs so obtained can be further improved by treating them with an agent giving off halogen which treatment may also be carried out in the presence or absence of diluents with or without adding catalysts.

The following examples will serve to further illustrate the invention, but the invention is in no way restricted to these examples. The parts are by weight.

*Example 1.*

20 parts of the oxidized dibenzanthrone, described in Example 3 of Letters Patent No. 1,093,427 are boiled, under a reflux cooler, with 160 parts of benzotrichloride, hydrochloric acid gas being evolved by the reaction. After two hours the mass is cooled, the dyestuff formed is filtered off, washed with benzene and dried. It represents a dark blue powder, soluble in sulfuric acid of 66 degrees Baumé with a reddish violet color, which on careful dilution with water turns first blue, then greenish blue. In hot organic solvents, such as trichlorobenzene, it dissolves with a greenish blue color and a red fluorescence. The hydrosulfite vat is reddish blue and dyes cotton, after oxidation, greenish blue shades.

The oxidized dibenzanthrones described in the other examples of Letters Patent 1,093,427 may also be used, and parachlor-benzotrichlorid may be used instead of benzotrichlorid, yielding a very similar dyestuff.

*Example 2.*

5 parts of the dyestuff obtained according to the foregoing example are distributed in 100 parts of nitrobenzene. 10 parts of sulfuryl chlorid are then slowly introduced into the mixture at about 90 degrees centigrade, while stirring, whereupon heating at the same temperature is continued for a few hours. The dyestuff is then filtered off from the mixture, when cool, and worked up in the usual manner. It dyes cotton turquoise blue shades which are brighter and more greenish than the shades obtained with the original product.

If 0.2 parts of iodine are added before introducing the sulfuryl chlorid, a dyestuff producing still somewhat brighter dyeings is obtained.

Other agents giving off halogen may be applied in a suitable manner.

We claim:

1. The new vat coloring matters of the dibenzanthrone series which can be produced by the interaction of oxidized dibenzanthrone and benzotrichlorid, and which are characterized by containing combined chlorin and by dissolving in hot organic solvents greenish blue with a red fluorescence and in concentrated sulfuric acid reddish violet and in alkaline hydrosulfite solution reddish blue from which solution cotton is dyed greenish blue after exposure to the air.

2. The process of producing vat coloring matters, which consists in causing benzotrichlorid to react with an oxidized dibenzanthrone.

3. The process of producing vat coloring matters which consists in causing benzotrichlorid to react with an oxidized dibenzanthrone, and treating the product with an agent giving off halogen.

In testimony whereof we have hereunto set our hands.

ARTHUR LÜTTRINGHAUS. [L. S.]
PAUL NAWIASKY. [L. S.]

Witnesses:
C. C. L. B. WYLES,
H. WEICHERT.